US009278681B2

(12) United States Patent
Liang et al.

(10) Patent No.: US 9,278,681 B2
(45) Date of Patent: Mar. 8, 2016

(54) HYBRID ELECTRIC VEHICLE DRIVELINE ACTIVE DAMPING AND TRANSIENT SMOOTHNESS CONTROL

(71) Applicant: Ford Global Technologies, LLC, Dearborn, MI (US)

(72) Inventors: Wei Liang, Farmington Hills, MI (US); Jeffrey Allen Doering, Canton, MI (US); Xiaoyong Wang, Novi, MI (US); Thomas Chrostowski, Chesterfield, MI (US); Jonathan Andrew Butcher, Farmington, MI (US); Ming Lang Kuang, Canton, MI (US); Fazal Urrahman Syed, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 118 days.

(21) Appl. No.: 13/837,680

(22) Filed: Mar. 15, 2013

(65) Prior Publication Data
US 2014/0277875 A1 Sep. 18, 2014

(51) Int. Cl.
*B60W 20/00* (2006.01)
*B60W 10/06* (2006.01)
*B60W 10/08* (2006.01)
*B60K 6/445* (2007.10)
*B60W 30/20* (2006.01)

(52) U.S. Cl.
CPC .............. *B60W 20/00* (2013.01); *B60K 6/445* (2013.01); *B60W 10/06* (2013.01); *B60W 10/08* (2013.01); *B60W 20/1084* (2013.01); *B60W 30/20* (2013.01); *B60W 2710/083* (2013.01); *Y02T 10/6286* (2013.01); *Y02T 10/7275* (2013.01); *Y10S 903/93* (2013.01)

(58) Field of Classification Search
CPC ..... B60W 10/08; B60W 10/06; B60W 20/00; B60W 30/20; B60W 2710/083; B60W 2710/105; B60W 20/1084; F02D 2250/18; B60K 6/445; Y02T 10/6286; Y02T 10/7275; Y10S 903/93
USPC ........................................ 701/22, 61; 180/381
See application file for complete search history.

(56) References Cited

U.S. PATENT DOCUMENTS

| 6,565,479 | B2 * | 5/2003 | Fattic et al. ........................ 477/3 |
| 7,070,530 | B2 | 7/2006 | Ai et al. |
| 7,292,917 | B2 * | 11/2007 | Kuang et al. ..................... 701/22 |
| 7,497,146 | B2 * | 3/2009 | Clausin ........................ 74/574.1 |
| 7,680,567 | B2 | 3/2010 | Syed et al. |

(Continued)

FOREIGN PATENT DOCUMENTS

WO 2011004228 1/2011

OTHER PUBLICATIONS

Fazal U. Syed, Ming L. Kuang, and Hao Ying, Active Damping Wheel-Torque Control System to Reduce Driveline Oscillations in a Power-Split Hybrid Electric Vehicle, IEEE Transactions on Vehicular Technology, Nov. 2009, pp. 4769-4785, vol. 58, No. 9.

*Primary Examiner* — Jason Holloway
(74) *Attorney, Agent, or Firm* — David B. Kelley; Brooks Kushman P.C.

(57) ABSTRACT

A method and system for controlling a hybrid electric vehicle include controlling torque in a traction motor in response to a provisional motor torque that has been adjusted based on a difference between a measured traction motor speed and a calculated vehicle speed and filtered to attenuate a resonant driveline frequency.

20 Claims, 4 Drawing Sheets

(56) References Cited

U.S. PATENT DOCUMENTS

| | | | |
|---|---|---|---|
| 8,140,230 B2 * | 3/2012 | Haggerty et al. | 701/54 |
| 8,290,656 B2 | 10/2012 | Fujimoto et al. | |
| 2003/0017910 A1 * | 1/2003 | Fattic et al. | 477/3 |
| 2005/0167170 A1 * | 8/2005 | Hisada et al. | 180/65.2 |
| 2006/0025905 A1 * | 2/2006 | Zhao et al. | 701/22 |
| 2006/0025906 A1 * | 2/2006 | Syed et al. | 701/22 |
| 2006/0030979 A1 * | 2/2006 | Kuang et al. | 701/22 |
| 2009/0114492 A1 * | 5/2009 | O'Leary et al. | 188/378 |
| 2010/0087996 A1 * | 4/2010 | Haggerty et al. | 701/58 |
| 2010/0222949 A1 * | 9/2010 | Muta | 701/22 |
| 2012/0235612 A1 | 9/2012 | Akashi et al. | |

* cited by examiner

HYBRID ELECTRIC VEHICLE DRIVELINE ACTIVE DAMPING AND TRANSIENT SMOOTHNESS CONTROL

TECHNICAL FIELD

This disclosure relates to active damping and transient smoothness control in hybrid electric vehicles.

BACKGROUND

Hybrid Electric Vehicles (HEVs) may use various types of powertrain architectures to provide parallel, series, or a combination to transfer torque from two or more sources to the traction wheels. A power split architecture combines the driving torque generated by the engine and the torque generated by one or more electric machines in various operating modes. A representative power split architecture is illustrated in FIG. 1. The two electric machines, referred to as the motor and the generator, may be implemented by permanent-magnet AC motors with three-phase current input. The engine and the generator may be connected by a planetary gear set with the engine crankshaft connected to the carrier and the generator rotor connected to the sun gear. The gear on the motor output shaft may be meshed to the counter shaft with a fixed ratio. The ring gear may also be connected to the counter shaft in a fixed ratio arrangement.

In this example, the motor is connected to the driveline through the countershaft in parallel to the engine-sourced torque output from the ring gear. The main functions of the motor include: 1. Drive the vehicle in electric drive mode by supplying full required torque; 2. Compensate the ring gear torque output based on driver commands; and 3. Damp driveline oscillation.

Vehicle drivability, including smooth vehicle operation, is a challenging issue for all types of automotive implementations. Driveline resonance is one of the major reasons that a driver feels unsmooth behavior during accelerations and decelerations with fast torque changes. As such, increasing damping around the driveline resonant frequency is a typical task for all types of automotive powertrain controls. Automatic transmissions with hydraulic torque converters have a large natural viscous damping effect due to the torque transfer loss on the fluid. In HEV applications that do not include a torque converter or similar device, this natural damping effect is diminished. The resonant mode can be excited by the motor torque input due to the fast response of the electric machines and the small damping ratio in the mechanical driveline. The transient smoothness is largely dependent upon a well-designed control system.

SUMMARY

A method of controlling a hybrid electric vehicle comprises controlling torque in a traction motor in response to a provisional motor torque that has been adjusted based on a difference between a measured traction motor speed and a calculated vehicle speed and filtered to cancel poles of a resonant driveline frequency. The calculated vehicle speed may be based on an average of wheel speed signals, which may be received from an antilock brake system control module. The calculated vehicle speed may alternatively be based on a measured motor speed that has been filtered through a low pass filter. The provisional motor torque may be generated in response to a vehicle start event. The provisional torque may also be generated in response to a change in a driver torque request.

An embodiment of a hybrid vehicle controller according to the present disclosure is configured to receive a torque request and output a commanded motor torque. The controller comprises control logic that filters a target torque to attenuate a driveline resonant frequency, adjusts the target torque based on a difference of a measured motor speed and a calculated vehicle speed, and generates a commanded motor torque based on the filtered and adjusted torque.

In some embodiments of a controller according to the present disclosure, the control logic that filters the target torque may include a band stop filter. The calculated vehicle speed may be based on an average of wheel speed signals, or it may be calculated based on a measured motor speed filtered through a low pass filter. If the calculated vehicle speed is based on an average of wheel speed signals, the wheel speed signals may be received from an antilock brake system control module. In some embodiments, the control logic that adjusts the commanded torque based on the difference of a measured motor speed and a calculated vehicle speed may be implemented in a feedback path. In such embodiments, the control logic that filters the commanded motor torque to remove frequency components may be implemented in a feedforward path or in a feedback path.

An embodiment of a hybrid vehicle according to the present disclosure comprises traction wheels, a motor drivably connected to the traction wheels by a driveline having a resonant frequency, and a motor controller. The motor controller is configured to generate a provisional motor torque, filter the provisional motor torque to attenuate a driveline resonant frequency, damp the provisional motor torque as a function of a difference of a measured motor speed and a calculated vehicle speed, generate a commanded torque based on the filtered and damped motor torque, and provide the commanded torque to the motor. Filtering the provisional motor torque may include using a band stop filter to remove the poles of the driveline resonant frequency and introduce a pair of well-damped poles at another frequency. The calculated vehicle speed may be based on an average of wheel speed signals, or it may be calculated based on a measured motor speed filtered through a low pass filter. If the calculated vehicle speed is based on an average of wheel speed signals, the wheel speed signals may be received from an antilock brake system control module.

Embodiments according to the present disclosure provide a number of advantages. For example, the present disclosure provides a control system for an HEV that can increase the robustness of the motor torque control by removing the driveline resonant frequency from a motor torque command to improve drivability.

The above advantage and other advantages and features of the present disclosure will be readily apparent from the following detailed description of the preferred embodiments when taken in connection with the accompanying drawings.

DETAILED DESCRIPTION

As those of ordinary skill in the art will understand, various features of the present invention as illustrated and described with reference to any of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
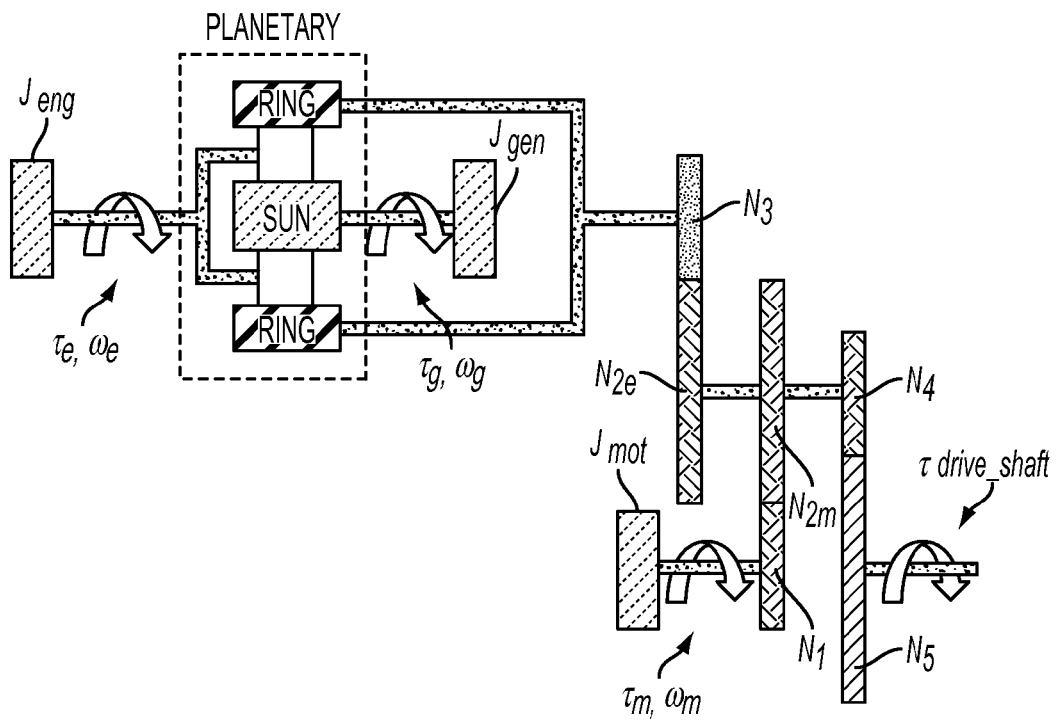
FIG. 1 illustrates a power split architecture for a HEV in schematic form.

Referring now to FIG. 1, an HEV may have a power split architecture as illustrated. In such an HEV, the motor torque may be used for damping by taking advantage of its higher bandwidth compared to the combustion engine. An active damping (anti-jerky, anti-shuffle) control is desired for smooth operation.

In this configuration, the ring gear torque can be used by the motor torque controller for torque compensation. In steady state operation, the ring gear torque has a fixed ratio to the generator torque and the engine torque. As such, the ring gear torque can be calculated directly from the generator torque according to the following:

$$\tau_r = \frac{1}{\rho}\tau_g \quad (1)$$

During transient events, both the engine speed and the generator speed change. An inertia term is usually involved, which makes equation (1) less accurate, but other methods can be used to calculate the transient ring gear torque. For example, during a transient event, the sun gear torque may be calculated based on the generator torque minus the generator inertia torque. Then the reflected ring gear torque may be determined according to:

$$\hat{\tau}_r = \frac{1}{\rho}(\tau_g - J_g \dot{\omega}_g) \quad (2)$$

where $J_g$ is the lumped moment of inertia of the generator and the sun gear. The ring gear torque is negative in the steady state based on the sign convention used here.

The motor torque is calculated to provide the driver's commanded wheel torque at any ring gear torque output according to:

$$\tau_m(t) = \rho_{m2d}\tau_{w\_cmd}(t) + \rho_{m2p}\hat{\tau}_r(t) \quad (3)$$

where $\tau_{w\_cmd}$ is the driver commanded wheel torque and $\rho_{m2d}$ and $\rho_{m2p}$ are gear ratios from the motor to the wheel and from the motor to the ring gear.

During some transient events, namely engine start/stop and large variation in the driver torque command, the inaccuracy of the ring gear torque and large torque ramp rate can excite the driveline resonant mode(s) and cause undesirable vehicle oscillation if no adequate counter measure is used to damp the motor torque. A mechanical damper is cost inefficient and only works within a narrow bandwidth of the exciting frequency. As such, a logic-based or software solution is more desirable for this case.

Figure 2:
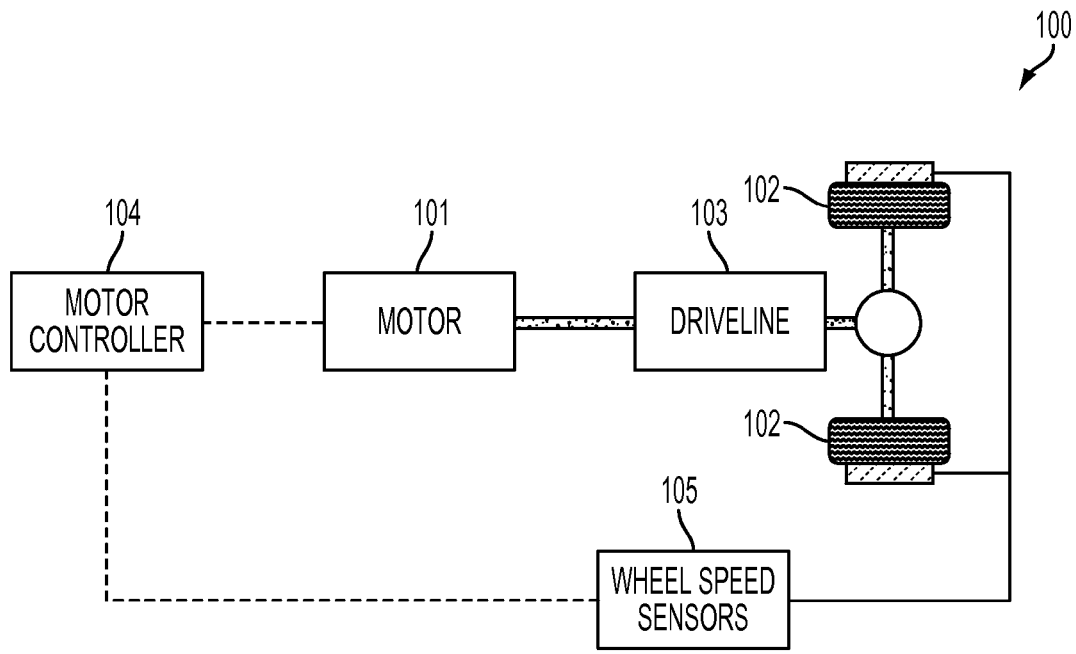
FIG. 2 is a block diagram of an HEV according to one embodiment of the present disclosure.

Referring now to FIG. 2, a block diagram illustrates a hybrid vehicle having a mechanical driveline according to various embodiments of the present disclosure. In one embodiment, vehicle 100 is an HEV having a power split architecture such as is illustrated in FIG. 1. The vehicle 100 includes a motor 101, traction wheels 102, and a driveline 103 that drivably connects the motor 101 and traction wheels 102, as illustrated by the heavy line. The driveline 103 has one or more resonant frequencies.

Vehicle 100 also includes a motor controller 104. The motor controller receives torque requests as signals from other controllers (not shown). The motor controller 104 controls or is in communication with motor 101 and wheel speed sensors 105, as indicated by the dashed line. The motor controller 104 may generate torque commands and provide the torque commands to the motor 101. The motor in turn generates the commanded torque and transmits it to the traction wheels 102 through the driveline 103. One or more wheel speed sensors 105 may communicate directly or indirectly with motor controller 104. In various embodiments, wheel speed sensors 105 may be incorporated into an antilock brake system (ABS) that includes an ABS control module (not shown) in communication with motor controller 104.

Figure 3:
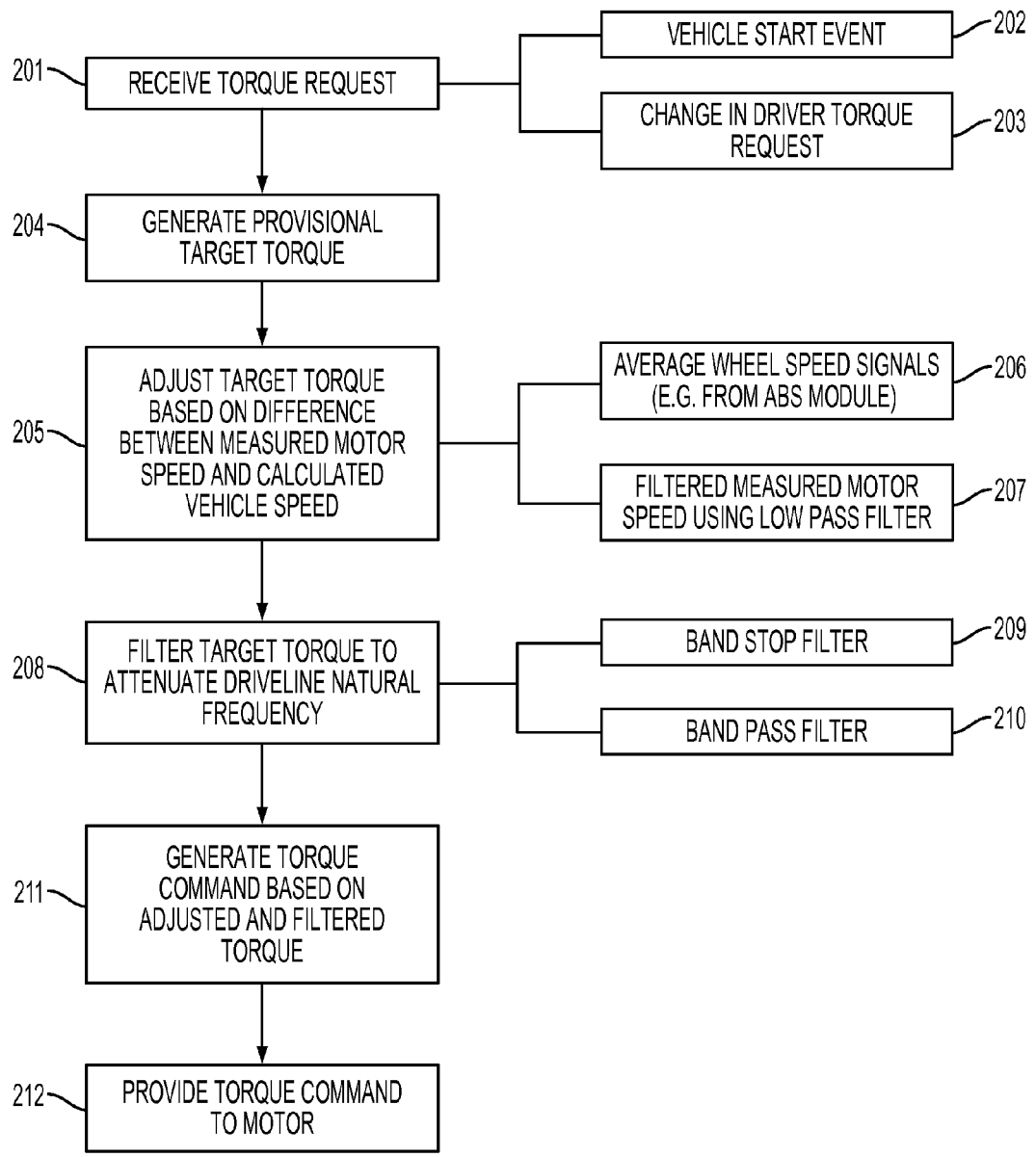
FIG. 3 is a flowchart illustrating an algorithm for controlling motor torque in an HEV according to one embodiment of the present disclosure.

Referring now to FIG. 3, a flowchart illustrates operation of a system or method for controlling a hybrid vehicle according to various embodiments of the disclosure. As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in the Figures. Similarly, one or more steps or functions may be repeatedly performed, although not explicitly illustrated. In one embodiment, the functions illustrated are primarily implemented by software, instructions, code or control logic stored in a computer readable storage medium and executed by one or more microprocessor-based computers or controllers to control operation of the vehicle. All of the illustrated steps or functions are not necessarily required to provide various features and advantages according to the present disclosure. As such, some steps or functions may be omitted in some applications or implementations. The algorithm for controlling a motor in an HEV according to one embodiment of the present disclosure as illustrated in FIG. 3 includes steps or functions that may be represented by control logic or software executed by one or more microprocessor-based controllers, such as motor controller 104, for example.

As illustrated in FIG. 3, a torque request is received in block 201. The torque request may be in response to a vehicle start event as illustrated in block 202, or in response to a change in driver requested torque as illustrated in block 203. A provisional target torque is generated, as illustrated in block 204. The target torque is adjusted based on a difference between a measured motor speed and a calculated vehicle speed, as illustrated in block 205. In one embodiment, the vehicle speed is calculated based on an average of wheel speed signals, such as may be received from an ABS module, as illustrated in block 206. In another embodiment described in greater detail with references to FIGS. 4 and 5, the vehicle speed is calculated based on a filtered measured motor speed as illustrated in block 207, where the filtering is a low pass filter that removes transients. The target torque is filtered to attenuate a driveline natural or resonant frequency, as illustrated in block 208. This filtering may be performed using a band stop or notch filter as illustrated in block 209 or a band pass filter as illustrated in block 210. A torque command is generated based on the adjusted and filtered torque, as illustrated in block 211. The torque command is then provided to the motor, as illustrated in block 212.

Figure 4:
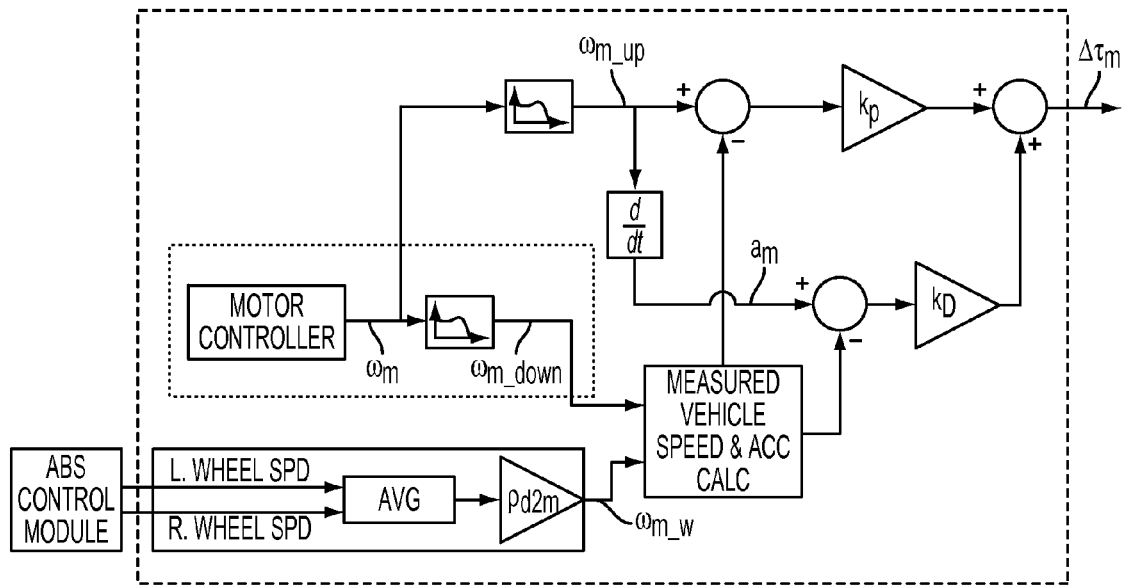
FIG. 4 illustrates a control for active damping of motor torque according to one embodiment of the present disclosure.

Referring now to FIG. 4, a proportional plus derivative (PD) control structure is shown that outputs a torque adjustment based on a measured motor speed and a calculated vehicle speed. The input to the controller is a calculation of driveline oscillation. This calculation may be made by using the measured motor speed minus the vehicle speed calculated from the wheel speed signals, such as ABS speed signals. Since the vehicle has much larger inertia than the drivetrain, its speed is less affected by torque oscillation from the powertrain. The motor speed, however, is affected by torque changes on the motor and on the engine because of the small mechanical damping of the driveline. The speed difference used in the control takes the form $$e = \omega_m - \omega_{m\_w} \tag{4}$$

where the reflected wheel speed is calculated by $$\omega_{m\_w} = \frac{\omega_l + \omega_r}{2} \tag{5}$$

The left and right wheel speed signals $\omega_l$ and $\omega_r$ may be communicated by the ABS control module or other appropriate sensor(s). Equation (4) represents the speed difference between the motor, which is upstream of the driveline, and the vehicle wheels, which are downstream of the driveline.

Figure 5:
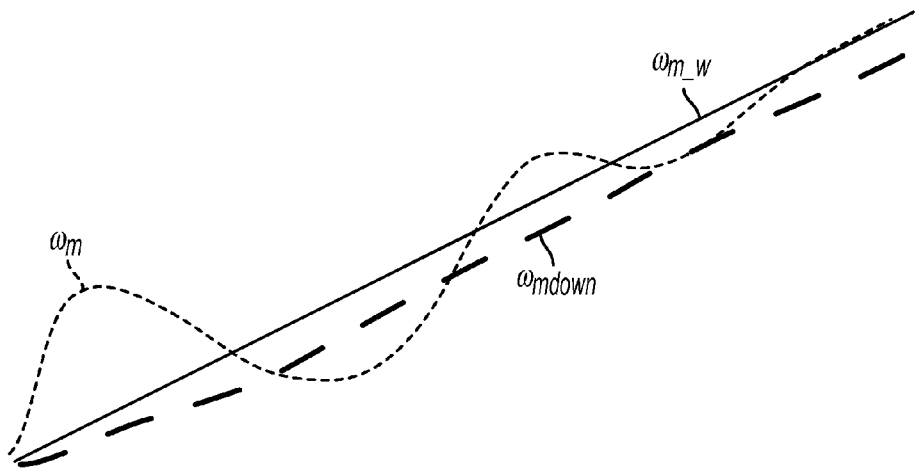
FIG. 5 illustrates methods for calculating vehicle speeds.

A backup mechanism is also placed in this algorithm to calculate vehicle speed. If wheel speed signals are not available or the signal quality cannot satisfy the control requirement, an alternative calculation may be used for the wheel speed calculation, such as:

$$\omega_{m\_down}(s) = F(s)\omega_m(s) \tag{6}$$

where F(s) is a low pass filter selected to remove any fast transients related to the motor speed itself. This calculation generates an inferred vehicle speed from the motor speed. Although it is less accurate, it is available without requiring the signals from any wheel speed sensors. While this calculation could be used as the primary method for determining vehicle speed, it is used as a backup calculation in this embodiment of the control system. The relationship of the speed signals is illustrated in FIG. 5.

In the representative embodiment illustrated, the PD control has the following transfer function:

$$H(s) = k_P + k_D \frac{s}{s+p} \tag{7}$$

For the driveline system, the proportional control of the speed difference (4) will introduce an additional damping effect of the system. The derivative control will increase the motor inertia.

In addition to the PD controller, a filter is implemented to attenuate a driveline natural frequency. The driveline dynamics generally result in a fixed resonant frequency determined by various system parameters. The resonant frequency has little variation during vehicle usage, but may vary somewhat from vehicle to vehicle. Thus a pole cancellation method can be a powerful and reliable counter measure used in the control system to attenuate the specific driveline frequency.

The transfer function of a simplified driveline model for a representative hybrid electric vehicle having a mechanical driveline can be written as $$P(s) = \frac{\omega_n^2}{s^2 + 2\xi\omega_n s + \omega_n^2} \tag{8}$$

which is a second order system with a small natural damping ratio. One way to remove the oscillation from these less damped system poles is to cancel them using the control in the feedforward path as represented by:

$$H_F = \frac{s^2 + 2\xi\omega_n s + \omega_n^2}{s^2 + 2\varphi\omega_{n1} s + \omega_{n1}^2} \tag{9}$$

where $\phi > \xi$. Controller (9) cancels out the less damped poles of the driveline natural frequency and introduces a pair of well-damped poles at another frequency. The selection of values for $\phi$ and $\omega_n$ may be determined during vehicle calibration and development and may vary based on the particular vehicle configuration.

The controller (9) functions as a band stop filter or a notch filter. As such, the controller (9) may be tuned to remove the frequency content related to the driveline resonant frequency so the closed loop system is more damped in the designated frequency range.

Figure 6:
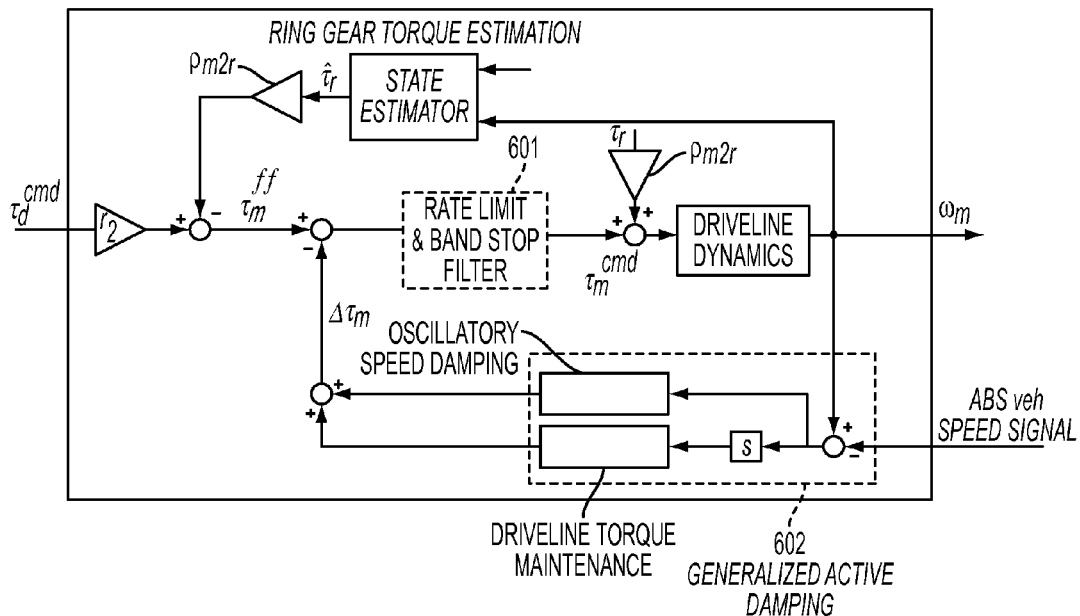
FIG. 6 illustrates a control for damping motor torque having a filter in a feedforward path.
Figure 7:
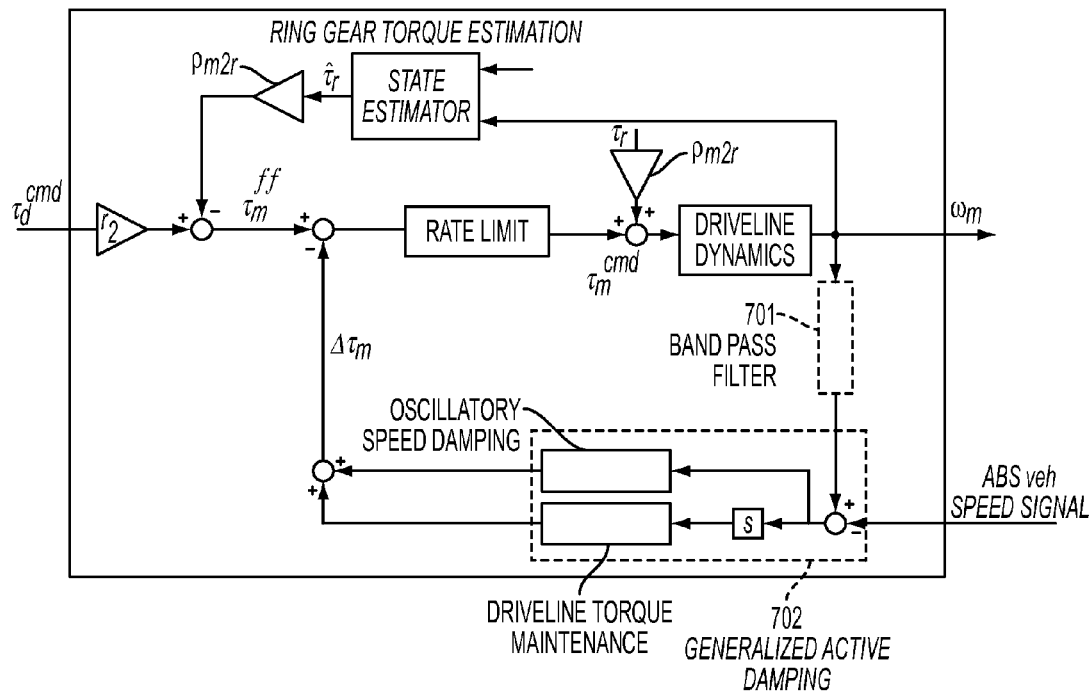
FIG. 7 illustrates a control for damping motor torque having a filter in a feedback path.

The PD controller and filter may be placed in different locations in the control system, as illustrated in FIGS. 6 and 7. In the embodiment illustrated in FIG. 6, band stop filter 601 is positioned in the feedforward loop to cancel out the driveline resonant frequency. It works together with the PD active damping control 602, placed in the feedback loop, to further increase the system damping ratio. The active damping control 602 is of a similar type as illustrated and described with reference to FIG. 4.

As generally illustrated in FIG. 6, the controller controls traction motor torque in response to a provisional motor torque that is adjusted based on a difference between the measured traction motor speed and a calculated vehicle speed that is filtered to attenuate a driveline resonant frequency using bandstop filter 601 positioned in the forward path. The calculated vehicle speed is based on an average of wheel speed signals or may be determined from an ABS vehicle speed signal.

In the representative embodiment illustrated in FIG. 7, a band pass filter 701 is used in the feedback path to the PD active damping control 702 rather than a band stop filter in the feedforward path as illustrated in the embodiment of FIG. 6. In this arrangement, band pass filter 701 removes frequency content outside of the range of interest. This results in the damping effect introduced by the PD controller 702 being focused around the range of the driveline natural frequency.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

As can be seen from the various embodiments, the present invention provides a control system that can increase the robustness of the motor torque control by removing the driveline resonant frequency from a motor torque command. This improves the drivability of a power split HEV.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a hybrid electric vehicle comprising:
   commanding a traction motor to supply a traction motor torque in response to a provisional motor torque, the provisional motor torque being adjusted by a PD control based on a difference between a measured traction motor speed and a calculated vehicle speed and filtered by a filter to attenuate a driveline natural resonant frequency, the PD control being distinct from the filter.

2. The method of claim 1, wherein the calculated vehicle speed is based on an average of wheel speed signals.

3. The method of claim 2, wherein the wheel speed signals are received from an antilock brake system control module.

4. The method of claim 1, wherein the calculated vehicle speed is based on a measured motor speed filtered through a low pass filter.

5. The method of claim 1, wherein the provisional motor torque is generated in response to an engine start event.

6. The method of claim 1, wherein the provisional motor torque is generated in response to a change in driver torque request.

7. A hybrid vehicle controller configured to receive a torque request and output a commanded motor torque, the controller comprising control logic that controls motor torque based on a target torque, the target torque being filtered by a filter to attenuate a driveline natural resonant frequency and adjusted by a PD control based on a difference of a measured motor speed and a calculated vehicle speed, the filter being distinct from the PD control.

8. The controller of claim 7, wherein the control logic comprises a band stop filter that filters the target torque.

9. The controller of claim 7, wherein the control logic comprises a band pass filter that filters the target torque.

10. The controller of claim 7, wherein the calculated vehicle speed is based on an average of wheel speed signals.

11. The controller of claim 10, wherein the wheel speed signals are received from an antilock brake system control module.

12. The controller of claim 7, wherein the calculated vehicle speed is based on a measured motor speed filtered through a low pass filter.

13. The controller of claim 7, wherein the control logic comprises a closed loop controller that adjusts the commanded torque based on a difference between a measured motor speed and a calculated vehicle speed in a feedback path.

14. The controller of claim 13, wherein the closed loop controller includes a feedforward loop that filters the commanded motor torque to remove frequency components related to the driveline natural resonant frequency in the feedforward path.

15. The controller of claim 13, wherein the closed loop controller filters the commanded motor torque to remove frequency components related to the driveline natural resonant frequency in the feedback path.

16. A hybrid vehicle comprising:
   a motor drivably connected to traction wheels by a driveline having a natural resonant frequency; and
   a motor controller configured to control motor torque in response to a provisional motor torque, the provisional motor torque being filtered by a filter to attenuate a driveline resonant frequency and damped by a PD control, distinct from the filter, based on a difference of a measured motor speed and a calculated vehicle speed.

17. The hybrid vehicle of claim 16, wherein the motor controller filters the provisional motor torque using a band stop filter to remove poles of the driveline natural resonant frequency and introduce a pair of well-damped poles at another frequency.

18. The hybrid vehicle of claim 16, wherein the calculated vehicle speed is based on an average of wheel speed signals.

19. The hybrid vehicle of claim 18, wherein the wheel speed signals are received from an antilock brake system control module.

20. The hybrid vehicle of claim 16, wherein the calculated vehicle speed is based on a measured motor speed filtered through a low pass filter.

* * * * *